United States Patent [19]

Potvin

[11] Patent Number: 4,976,134
[45] Date of Patent: Dec. 11, 1990

[54] MODIFIED GAS GAUGE

[75] Inventor: Michael J. Potvin, Wichita, Kans.

[73] Assignee: The Kansas Power and Light Company, Topeka, Kans.

[21] Appl. No.: 432,366

[22] Filed: Nov. 6, 1989

[51] Int. Cl.⁵ ............................................. G01F 25/00
[52] U.S. Cl. ......................................................... 73/3
[58] Field of Search ..................... 73/3, 865.6, 865.8, 73/865.9; 137/557; 251/117

[56] References Cited

U.S. PATENT DOCUMENTS

| | | |
|---|---|---|
| 308,975 | 12/1884 | Mixer . |
| 331,890 | 12/1885 | Kelly . |
| 1,023,739 | 4/1912 | Joyce .......................................... 73/3 |
| 1,103,882 | 7/1914 | Kidder ....................................... 73/3 |
| 1,306,657 | 6/1919 | Dezendorf ................................. 73/3 |
| 1,576,662 | 8/1922 | Leonard . |
| 1,844,843 | 2/1932 | Dezendorf ................................. 73/3 |
| 2,214,250 | 3/1939 | Landrum . |
| 2,676,601 | 4/1950 | Senna . |

Primary Examiner—Robert Raevis
Attorney, Agent, or Firm—Hovey, Williams, Timmons & Collins

[57] ABSTRACT

Device (10) is provided for insertion into meter (76) in the course of testing gas system (68). Device (10) advantageously allows a technician to make fewer trips into residence (80) in the course of a gas turn-on procedure. House line (78) is first disconnected from meter (76) and device (10) is then inserted into meter (76) at (84). After an initial full flow check by passage of gas through aperture 38, valve body (50) is shifted to a closed position wherein gas flow is controlled by smaller apertures (52) so that a second flow rate is achieved simulating the pilot light of one appliance being lit in residence (80). In this fashion, two trips into residence (80), respectively to turn on and turn off one pilot light, are avoided.

2 Claims, 1 Drawing Sheet

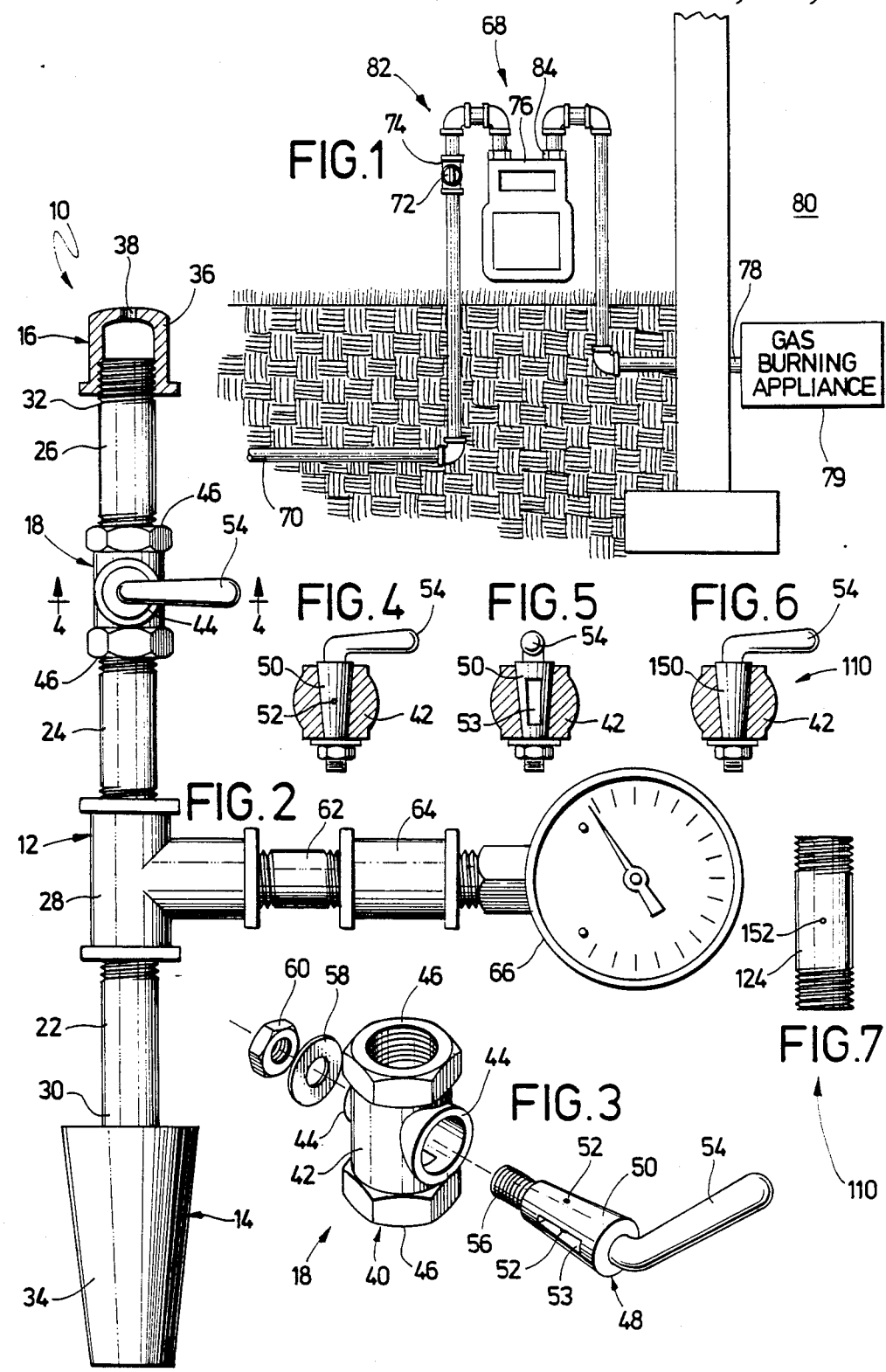

MODIFIED GAS GAUGE

BACKGROUND OF THE INVENTION

1. Field of the Invention

This invention relates to a modified gas gauge of simple yet highly effective construction which has numerous advantages including convenience, compactness and easy portability. More particularly, it is concerned with a modified gas gauge having a conduit, coupling structure for inserting the gauge into a gas meter and structure for simulating first and second flow conditions pertaining to a gas supply system. In this fashion, the user may perform multiple gas flow tests from a single location outside of a house or other building without the need for many trips into the building to establish different gas flow situations.

2. Description of the Prior Art

Field personnel for natural gas companies must perform many tests when connecting a gas line, such as when initiating service for a commercial or residential customer. Typically, numerous trips into the premises are required in the course of the turn-on procedure. For example, when turning on the gas supply for a residential customer, the meter must be checked while the pilot light for one of the gas appliances is lit, with all the other appliances shut off. This meter test requires two additional trips into the house for the purpose of lighting and then extinguishing the pilot light in a selected appliance. What is needed is a device which will simulate, at the test site, conditions within the house such as the consumption of gas by a pilot light so that multiple time consuming trips in and out of buildings may be eliminated.

SUMMARY OF THE INVENTION

The problems outlined above are in large measure solved by the modified gas gauge flow tester in accordance with the present invention. That is to say, the gauge hereof serves to simulate selected flow conditions so as to reduce the number of trips to and from a test site.

The present invention broadly includes a fluid conveying conduit having two ends, structure for coupling one of the ends to a fluid transfer assembly (e.g., a conventional gas meter), and apparatus operably connected with the conduit for simulating first and second flow conditions of different magnitude. The second simulation apparatus has first and second positions such that in the second position the second simulation apparatus effectively controls the flow rate through the conduit at a relatively lower second level, while in the first position the first simulation apparatus effectively controls the flow rate at a relatively higher first level.

In preferred forms the second simulation apparatus includes an apertured, shiftable valve body which cooperatively permits the first flow condition when in the open setting and restricts flow to the second level in the closed position. In an alternative embodiment, a conventional valve body is utilized, and the second flow rate is accomplished by positioning an aperture between the first end of the conduit and the valve body.

As one example, the modified gas gauge device can be used in the course of a turn-on order for a residential gas supply system including a meter and a house line. The service technician disconnects the meter from the house line and inserts the device into the meter. The valve body is then shifted to the closed position to simulate the consumption of gas caused by the pilot light of one appliance at the end of the house line. By such shifting of the valve body the technician avoids two trips into the house which would otherwise be necessary to light and extinguish a pilot light.

BRIEF DESCRIPTION OF THE DRAWING

FIG. 1 is a schematic view of a typical residential gas system;

FIG. 2 is a side elevational view of the modified gas gauge/tester in accordance with the present invention;

FIG. 3 is an exploded view of a stopcock valve assembly utilized in the present invention;

FIG. 4 is a sectional view taken along line 4—4 of FIG. 2, illustrating the valve body in the closed position;

FIG. 5 is the sectional view of FIG. 4 with the valve body in the open position;

FIG. 6 is a view similar to that of FIGS. 4 and 5 for another embodiment, illustrating the alternative valve body in the closed position; and FIG. 7 is a partial, elevational view of the embodiment of FIG. 6, which illustrates the alternative placement of the second aperture on the exterior of the conduit.

DESCRIPTION OF THE PREFERRED EMBODIMENT

Referring now to the drawing in general, and FIG. 2 in particular, a modified gas gauge or device 10 in accordance with the invention broadly includes a conduit 12, coupling structure 14, first simulation apparatus 16, second simulation apparatus 18 and gauge assembly 20. Device 10 is adapted for insertion into fluid systems (e.g., metered gas systems) for the purpose of monitoring fluid flow therethrough and thereby checking the reliability of the gas meters.

In more detail, conduit 12 includes three ¼ inch, externally threaded, black pipe nipples 22–26 which can be alternatively constructed of any suitable metal or synthetic resin. Conduit 12 could also be integrally formed. Internally threaded tee piece 28 has three ports, two of which are mated with nipples 22 and 24 as shown. Conduit 12 presents a first end 30 and a second end 32, with the two ends being in fluid communication.

Coupling structure 14 includes hollow, tapered, resilient, rubber-like plug 34 which is mated with nipple 22 at first end 30 in a manner to allow fluid to flow thereinto. Coupling structure 14 may be made from any resilient material such as a synthetic resin and is adapted for insertion into a standard gas meter. It will be readily understood that other dimensions and materials could be used for constructing coupling structure for other kinds of fluid systems.

First simulation apparatus 16 includes an internally threaded, ¼ inch black pipe cap 36 having an aperture 38 therethrough. Aperture 38 is formed by using a number 33 size drill bit to drill a hole into cap 36 which is then threaded onto end 32 of conduit 12. The diameter of first aperture 38 is about 113 mils.

Referring to FIG. 3, second simulation apparatus 18 includes a stopcock valve assembly 40. Assembly 40 have a hollow valve frame 42 with valve ports 44 and internally threaded nipple ports 46 for respectively coupling with nipples 24 and 26 (as shown in FIG. 2). Still referring to FIG. 3, assembly 40 further includes valve member 48 having a frustoconical valve body 50, two aligned apertures 52, slot 53, operating lever 54 and threaded end 56 integrally formed on valve body 50. Washer 58 and nut 60 secure valve member 48 within valve frame 42 to complete assembly 40. Each of apertures 52 presents an identical diameter which is predetermined and relatively smaller than that of aperture 38. The diameter of each aperture 52 is preferably about 16 mils.

Referring once again to FIG. 2, gauge assembly 20 includes an externally threaded, ¼ inch nipple 62 coupled with the third port of tee piece 28 and an internally threaded collar 64 which is mated to an externally threaded gauge 66. Gauge 66 is conventional in nature and suitable for measuring a range of gas pressures found in commercial and residential systems. Gauge 66 is in fluid communication with first end 30 of conduit 12.

Referring now to FIGS. 6 and 7, portions of an alternative embodiment of the present invention, namely device 110, are shown. Device 110 is in all respects and structure the same as device 10 except for two instances noted below. The first difference is ascertained by comparing FIGS. 4 and 6. The second is ascertained by comparing FIG. 7 with FIG. 2.

As to the first difference and referring now to FIGS. 4 and 6, the respective second positions of valve bodies 50 and 150 are shown. These are the closed position for both respective devices and it will be noted by observing lever 54 that the second simulation apparatus as depicted in FIG. 2 is in such a closed or second position. By comparing FIGS. 4 and 6 it will be readily understood that device 10 includes two opposed apertures 52 on valve body 50 (only one of which is visible in FIG. 4) while valve body 150 of device 110 includes no such apertures. Of course, if valve body 50 were solid rather than having a slot 53, one second aperture spanning the valve body would be sufficient.

As to the second difference, FIG. 7 depicts a portion of nipple 124, in all respects analogous to nipple 24 of device 10 except that a second aperture 152 is formed, having dimensions exactly the same as that of second apertures 52 of device 10. By referring to FIG. 2 it will be appreciated that nipple 24 contains no exterior apertures.

Referring now to FIG. 1, a gas supply system 68 suitable for supplying gas to a residential consumer is shown. The system 68 includes a gas main line (not shown), service line 70 connected to the main, shut-off valve 72, regulator 74, meter 76, and house line 78. House line 78 is in turn return operatively coupled with gas burning appliances 79 within the house. The system 68 services residence 80 equipped with gas-burning appliances (not shown) located therein. The gas main line, service line 70, shut off valve 72, regulator 74 and meter 76 collectively constitute a fluid transfer assembly 82 which must be tested and monitored independently from house line 78 as discussed below. Meter 76 includes a visually observable test mechanism such as an analog hand, and conventional flowpreventing seals (not shown). The appliances within residence 80 one each connected to house line 78 so as to be supplied thereby.

FIG. 1 is illustrative rather than exhaustive of the type of fluid system suitable for a device in accordance with the present invention. For example, a commercial gas system would be suitable for such use–also an industrial setting would be appropriate. Hence, the scope of this invention covers not only turn-on orders for residential gas customers but also includes diagnostic and repair procedures. Indeed, the invention is applicable to any fluid flow system, whether liquid or gas, which requires simulation of a plurality of predetermined flow rates by selectively utilizing apertures of various dimensions suitably corresponding to the required flow rates. Thus, the detailed procedure described below is meant simply as an illustration of one specific use for the present invention.

Referring now to the drawing in general, with specific attention to FIG. 1, a field technician (such as a gas service representative or the like) will arrive at the site of system 68 to turn on gas at residence 80. The procedure used by the technician will be described briefly by way of overview and then in more detail. In the course of turning on a residential gas supply associated with system 68, the technician will:

(a) disconnect meter 76 from house line 78 and remove any flow-preventing seals from meter 76;

(b) insert device 10 into meter 76;

(c) turn on shut-off valve 72 so that gas flows through meter 76 and device 10;

(d) check the amount of pressure created by the regulator 74 by reading gauge 66 with valve body 50 in the first (open) position;

(e) recheck regulator 74 by covering the first aperture 38 and reading gauge 66;

(f) remove device 10 from meter 76 and reconnect meter 76 to house line 78;

(g) check house line 78 by reading the meter testhand;

(h) disconnect meter 76 from house line 78 and insert device 10 into meter 76;

(i) place valve body 50 in the second (closed) position;

(j) read the meter test-hand;

(k) remove device 10 from meter 76 and reconnect meter 76 to house line 78;

(l) read the meter test-hand twenty minutes later; and (m) light the appliances.

All disconnecting and reconnecting of meter 76 and house line 78 is done at a suitable juncture such as shown by reference numeral 84, this being referred to as the downstream on output side of meter 76. Once the flow-preventing seals are removed from the meter 76, they are never reinserted therein. Any time the device 10 is inserted into meter 76 it is done by mating coupling structure 14 with meter 76 as at juncture 84.

After the shut-off valve 72 has been turned on in step (c) and gas is therefore flowing through meter 76 and device 10 out first aperture 38 into the atmosphere, step (d) is performed to check the regulator pressure. The technician expects a reading of about 4.0 ounces of pressure on gauge 66. This situation, referred to as a first flow rate, simulates the amount of gas flowing through system 68 to be delivered to the appliances when the appliances are operating at a typical flow rate (i.e. fluid transfer assembly 82 is delivering about 50 cubic feet per hour to the atmosphere at this point). The purpose of delivering gas to the atmosphere outside the house rather than checking the regulator pressure with the house line 78 connected to meter 76, is to prevent any accidents (within the house) which might arise from irregular flow pressure. Hence, it is more prudent to check the regulator pressure prior to performing tests involving house line 78.

Regulator 74 is rechecked in step (e) by covering the first aperture 38 (such as the service technician covering first aperture 38 with his thumb) and reading gauge 66. This is the so-called "lock-up" test, wherein the technician expects to get a reading of about 4.25 ounces of pressure as opposed to the 4.0 ounces expected in step (d) when the first flow rate is being simulated.

To digress briefly and referring to FIG. 5, the first position (i.e. open position) is shown wherein gas freely flows from first end 30 to first aperture 38 via slot 53. In this first position, the first flow rate is being simulated, wherein first aperture 38 is the smallest orifice within conduit 12 controlling gas flow from first end 30 to aperture 38. By casual inspection it will be noted that first aperture 38 is of relatively smaller diameter than slot 53, so that first aperture 38 controls the rate of gas flow in the first position. As mentioned above, the diameter of first aperture 38, which is about 113 mils, causes a first flow rate of about 50 cubic feet per hour. This first flow rate corresponds with a typical residential gas consumption rate and is suitable for checking pressure delivered by regulator 74. Thus it will be seen that the diameter of first aperture 38 is preselected to simulate the flow of natural gas through house lines 8 when gas-burning appliances within residence 80 are consuming gas at typical levels.

Referring to FIG. 4, the second position i.e. closed position) of device 10 is depicted. In this second position all gas must flow through aligned apertures 52 (only one of which is visible in FIG. 4. The diameter of each second aperture 52 is identical and relatively smaller than the diameter of first aperture 38; thus second apertures 52 control the rate of gas flow in the second position. The diameter of second apertures 52 causes a second flow rate of about 0.75 cubic feet per hour. This second flow rate corresponds with a typical residential gas consumption rate when the pilot light of one appliance only is lit. Thus it will be seen that the diameter of second apertures 52 is preselected to simulate the flow of natural gas through house line 78 when one gas burning appliance has its pilot light lit.

Returning to the procedure at step (f), the technician restores the configuration of FIG. 1 with the exception of leaving out the flow-preventing seals and the changed condition of the shut-off valve which is now in the open position. At step (g), there should be no movement of the meter testhand, since at this stage all appliances are shut off-there fore movement of the test-hand would indicate a leak within the house line 78 or connections between the house line 78 and the appliances. Thus, no meter test-hand deflection at step (g) is a confirmatory indication of a substantially leak-free house line.

Step (h) is analogous to steps (a) and (b). The act of placing valve body 50 in the second position in step (i) saves going into the residence 80 to turn on a pilot light of one appliance. The step of turning on a pilot light with the house line 78 connected to meter 76 was the prior technique for creating the second flow condition.

In step (j) a slight movement of the meter test hand is expected in order to determine that meter 76 is operating with sufficient sensitivity. That is to say, a slight deflection of meter 76 indicates that the meter is detecting a slight flow of gas in the second flow rate (i.e. the simulation of one pilot light lit in residence 80).

Step (k) is performed exactly as step (f). In the old method, an additional trip was required into the house, this time to shut off the pilot light previously lit in step (i) of the old method. Thus, steps (i) and (j) of the new method eliminate two time consuming, burdensome trips into the residence 80 in accordance with the present invention.

Step (l) involves waiting an appropriate amount of time to determine that there are no significant gas leaks within the house line 78. As an example, regulations might require that the house line lose no more than two cubic feet of natural gas per hour in which case a two-foot test-hand would be watched for twenty minutes. At the end of that time if the test-hand had been deflected one third or more of its total range, then an unsatisfactory leak rate would be indicated. Continuing with the regulatory example having a two-cubic-feet-per-hour standard, if the meter had a one-foot test-hand the waiting period in step (1) would be ten minutes. If the meter had a half-foot test-hand, the waiting period would be five minutes. In each case a testhand deflection of one third or more indicates violation of the two-feet-per-hour standard.

At step (m), and assuming that positive results have been attained on all previous steps, the pilot lights on all the appliances are lit so that the consumer may begin normal usage thereof.

With reference to device 110, partially illustrated in FIGS. 6 and 7, it will be noted that the exact procedure as above described will also be performed. While the steps will be identical, the difference will be in the second flow rate condition. At FIG. 6, showing the second position of valve body 150, it will be seen that no gas may flow out first aperture 38 in the closed position, therefore, the second flow rate condition will be simulated by the delivery of about 0.75 cubic feet of natural gas per hour to the atmosphere via second aperture 152 (see FIG. 7). Thus, devices 10 and 110 have identical second flow rate simulations, but device 10 vents gas via first aperture 38 while device 110 vents gas through aperture 152. The purpose of placing aperture 152 on the exterior of nipple 124 is to avoid possible problems that might arise with second aperture 52 in device 10. In particular, what is avoided is the accumulation of graphite, grit, dirt and the like at aperture 52. It will readily be understood that such a collection of debris is much less likely with second aperture 152 given its positioning on the exterior of nipple 124.

It will also be noted that in the first flow condition, device 110 will vent gas from both first aperture 38 and second aperture 152, resulting in a minutely greater first flow condition for device 110 than that of device 10. However, given the large difference in diameters for first aperture 38 and second aperture 152, there will be virtually no practical difference between the respective first flow conditions of devices 10 and 110.

What is claimed:

1. A method of testing the reliability of a gas meter presenting an input end, an output end, and a gas flow detecting mechanism between said ends, said method consisting essentially of the steps of:

providing a conduit having a gas inlet end and a gas outlet end with a selectively actuatable valve interposed in the conduit between said ends, said inlet and of said conduit being adapted for coupling to said meter output end for flow of gas from said output end into and through said valve and conduit, said conduit presenting a gas flow path therethrough wherein all gas from said meter output end passes through said valve means during all phases of the meter testing method;

operably coupling said gas inlet end of said conduit with said meter output end for flow of gas into and through the gas flow path presented by said conduit;

manipulating said valve means to a first flow condition therethrough for establishing the flow of gas out of said valve means and conduit at a first level simulative of a first gas flow condition through said meter, with all gas from said meter output end passing through said valve means;

thereafter changing the level of gas flow out of said conduit of manipulating said valve means to a second flow condition for establishing the flow of gas out of said valve means and conduit at a second level simulative of a second gas flow condition through said meter, with all gas from said meter output end passing through said valve means; and inspecting said gas meter flow detecting mechanism to confirm that said mechanism is responsive to said gas flow level change.

2. A method for turning on a gas supply associated with a system having a gas service line, a shut-off valve, a regulator, a meter having a test hand, and a house line with gas-burning appliances coupled thereto, the method comprising:

(a) disconnecting the meter from the houseline and removing any flow-preventing seals from the meter;

(b) providing a device including a conduit having one end, adapted for insertion into the meter to provide fluid communication therewith, and an other end operatively coupled with an apertured first simulation means for restricting fluid flow out of the device and thereby simulating a first flow condition, the device further including gauge means operatively coupled with the conduit for measuring pressure associated with the rate of fluid flow and an apertured second simulation means operatively coupled with the conduit, the second simulation means including an apertured valve body having first and second positions, the first position permitting the first simulation means to effectively control the rate of flow while the second position restricts the flow to a relatively smaller second flow condition;

(c) inserting the device into the meter;

(d) turning on the shut-off valve to allow gas to flow through the meter and device;

(e) checking the amount of pressure created by the regulator, by reading the gauge when the valve body is in the first position;

(f) rechecking the regulator by covering the first simulation means aperture and reading the gauge;

(g) removing the device from the meter and reconnecting the meter to the house line; checking the house line by reading the (h) checking the house line by reading the meter test-hand;

(i) disconnecting the meter from the houseline and inserting the device into the meter;

(j) placing the valve body in the second position;

(k) reading the test-hand of the meter;

(l) removing the device from the meter and reconnecting the meter to the house line;

(m) reading the test-hand twenty minutes later; and (n) lighting the appliances.

* * * * *